July 25, 1939.   F. J. CATANZARO   2,167,292
SAFETY GUARD
Filed July 23, 1938   2 Sheets-Sheet 1

Inventor
Frank J. Catanzaro
By Clarence A. O'Brien
and Hyman Berman
Attorneys

July 25, 1939. F. J. CATANZARO 2,167,292
SAFETY GUARD
Filed July 23, 1938 2 Sheets-Sheet 2
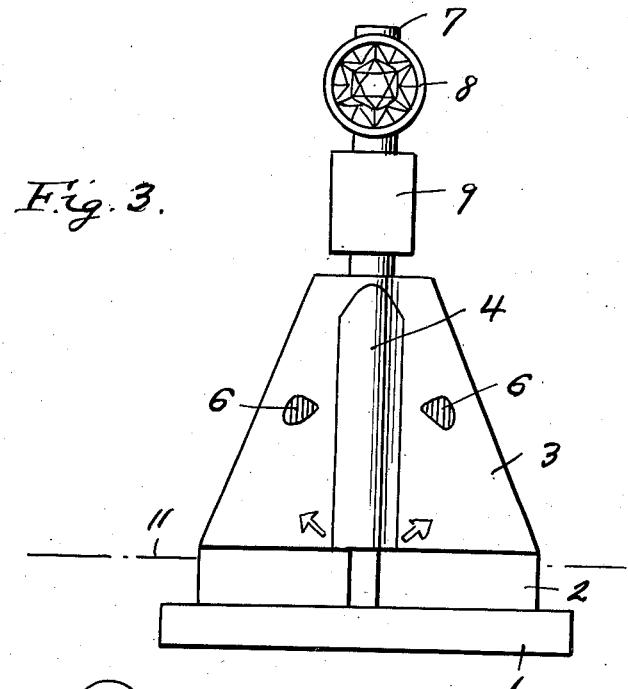
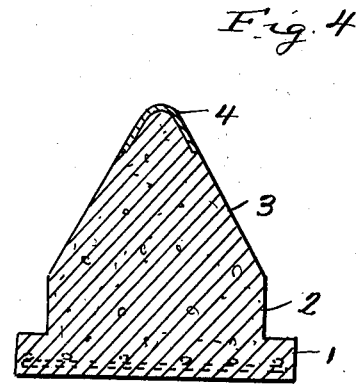
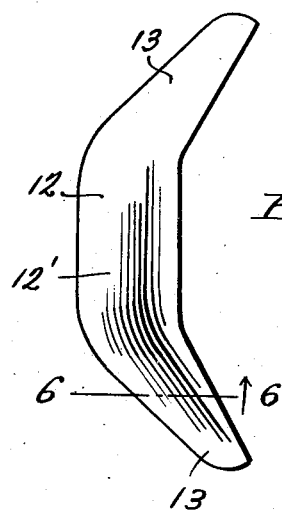
Inventor
Frank J. Catanzaro
By Clarence A. O'Brien
and Hyman Berman
Attorneys Patented July 25, 1939

2,167,292

UNITED STATES PATENT OFFICE 2,167,292

SAFETY GUARD

Frank J. Catanzaro, Cincinnati, Ohio

Application July 23, 1938, Serial No. 220,989

1 Claim. (Cl. 94—1)

This invention relates to a safety guard for street car loading platforms, approaches to bridges, culverts and the like, the general object of the invention being to provide a guard which is so formed as to deflect an automobile or other vehicle back on the road if the vehicle should strike the guard and to prevent the vehicle from striking persons on the platform and also to provide means for causing the front axle of a vehicle to ride up the guard, when the guard is placed in a street, such as at the end of a car loading platform, so that the vehicle will be stopped without serious damage to the vehicle.

Another object of the invention is to provide reflectors or lamps on certain parts of the guard to warn drivers of vehicles that they are approaching the guard and also to provide a spring bumper at the top of the guard for stopping a vehicle riding up the guard to a considerable extent.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 3 is a front view thereof.

Figure 1:
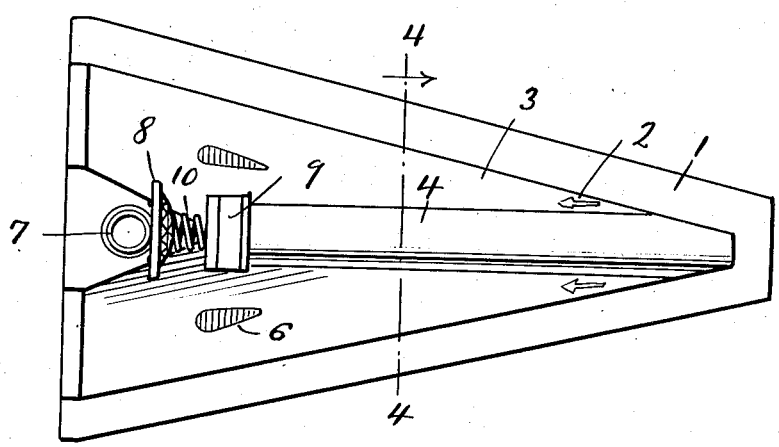
Figure 1 is a top plan view of a guard designed for an end of a loading platform.

Figure 4 is a section on the line 4—4 of Figure 1.

Figure 5 is a top plan view of a guard for a culvert, bridge or the like.

Figure 6 is a section on the line 6—6 of Figure 5.

Figure 2:
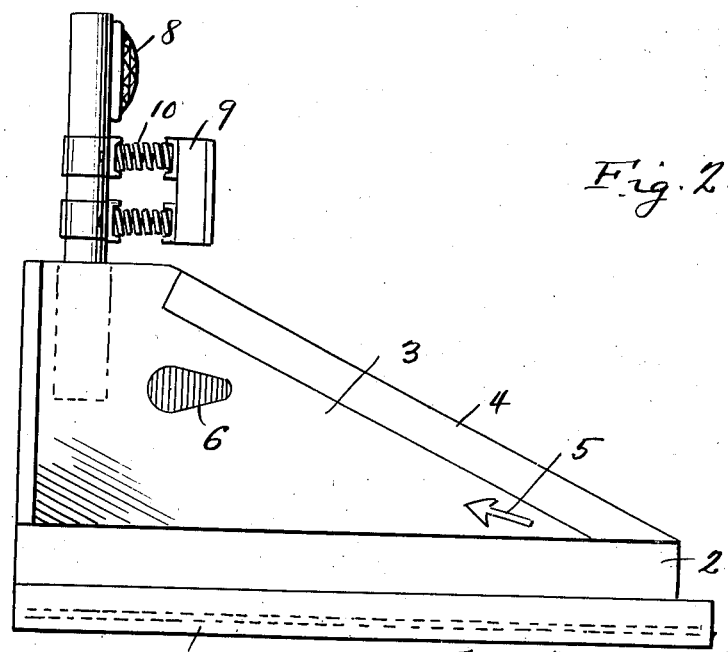
Figure 2 is a side view of the guard.

Referring to Figures 1 to 4, the numeral 1 indicates a base and the numeral 2 a curb forming member, and the numeral 3 indicates the body of the guard. These parts are formed of concrete and may be reinforced if desired and said parts form a body of substantially triangular shape in plan. As shown the curb forming member 2 is of less length and width than the base part 1 but the wide ends of the two parts 1 and 2 are substantially flush with each other as is the adjacent end of the body 3. This body 3 slopes upwardly and inwardly to its top and the top forms a ridge which slopes downwardly from a point adjacent the wide end to the small end of the member 2. This ridge part is covered by a steel plate 4 suitably connected with the body. Reflectors 5, preferably of arrow shape as shown in Figure 2 are placed at the small end of the body 3 at the sides thereof and other reflectors 6 are placed in the sides of the body at the large part thereof though if desired lamps may be used instead of or with such reflectors.

A tubular post 7 preferably of metal has its lower part placed in a sleeve embedded in the large end of the body 3 with the post extending well above the flat rear top portion of the body and this post carries a large reflector 8 and a bumper 9 which is supported by the springs 10 from the post, this bumper being located between the reflector 8 and the body. The device is inserted into the ground so that the road level will be of approximately the line shown at 11 in Figure 3. Thus if a vehicle approaches too close to a side of the member the front wheel will strike the upper part of the member 2 which deflects the wheel and thus causes the vehicle to go back on the road. If the vehicle should strike the device centrally the front axle will engage the plate 4 on the ridge of the device and thus ride up the same so that the momentum of the vehicle will be stopped without serious damage, if any, to the vehicle. However, if the vehicle should be coming at great speed the front axle would ride up the ridge and strike the bumper 9 which would absorb the shock and thus stop the vehicle. Of course, the device will protect persons standing on the platform as it will be impossible for the vehicle to ride up on the platform.

Figures 5 and 6 show a guard member for the side uprights of a culvert, bridge posts or the like, this member being of roughly U-shape as shown at 12 so that it will fit around an abutment or other member alongside the road with the outer side walls 4' sloping outwardly and downwardly from the top portion as shown at 12'. The end parts 13 also taper outwardly from the main part as shown in Figures 5 and 6. Thus a vehicle approaching too near the abutment will have one of its front wheels strike a part 13 which will deflect the wheel and cause the vehicle to go back on the road or if the vehicle strikes a member 13 centrally the front axle will ride up this member 13 which will check and finally stop the vehicle.

Thus I have provided simple means for deflecting the wheels of a vehicle back upon the road if the vehicle comes too close to the device or if the vehicle hits the device centrally then the front axle will simply ride up the device so that the vehicle will be stopped and this will take place without damage to the parts of the vehicle as only a front wheel will strike the device if the vehicle is driven too close to the device or if the vehicle strikes the device centrally then the front axle will strike the device and ride up the same. Lights and/or reflectors can also be placed on the device shown in Figures 5 and 6.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A safety guard of the class described comprising a base, a curb-forming part on the base, said part being of substantially triangular shape and having vertical side walls which are spaced inwardly from the side walls of the base, a body rising from the curb-forming part and of triangular shape in plan with the side walls sloping upwardly and inwardly from the side walls of the curb-forming part, the upper portions of the sloping parts of said side walls of the body forming a centrally arranged ridge which slopes downwardly and forwardly to the front end of the curb-forming part, a post embedded in the rear part of the upper portion of the body, a spring bumper carried by the post with the front face arranged over the upper end of the ridge and a reflector carried by the post above the bumper, said base, the curb-forming part and the body being integrally connected together.

FRANK J. CATANZARO.